United States Patent [19]

Washizu et al.

[11] Patent Number: 5,338,073
[45] Date of Patent: * Aug. 16, 1994

[54] SLENDER PIPE CONNECTING CONNECTOR

[75] Inventors: Katsushi Washizu, Numazu; Yuuji Miyauchi, Shizuoka, both of Japan

[73] Assignee: Usui Kokusai Sangyo Kaisha Ltd., Japan

[*] Notice: The portion of the term of this patent subsequent to Oct. 13, 2009 has been disclaimed.

[21] Appl. No.: 929,769

[22] Filed: Aug. 12, 1992

[30] Foreign Application Priority Data

Aug. 20, 1991 [JP] Japan .................. 3-232240

[51] Int. Cl.$^5$ .............................. F16L 37/00
[52] U.S. Cl. .......................... 285/319; 285/921
[58] Field of Search ..................... 285/319, 921

[56] References Cited

U.S. PATENT DOCUMENTS

| | | | |
|---|---|---|---|
| 2,784,987 | 3/1957 | Corcoran | 285/219 X |
| 3,885,851 | 5/1975 | Bennett | 285/319 X |
| 4,541,658 | 9/1985 | Bartholomew | 285/319 X |
| 4,915,421 | 4/1990 | Dennany, Jr. | 285/39 |
| 5,002,315 | 3/1991 | Bartholomew | 285/319 X |
| 5,112,084 | 5/1992 | Washizu | 285/921 X |
| 5,154,451 | 10/1992 | Washizu . | |
| 5,161,832 | 11/1992 | McNaughton et al. | 285/319 |
| 5,193,857 | 3/1993 | Kitamura | 285/319 |
| 5,219,188 | 6/1993 | Abe et al. | 285/319 |

FOREIGN PATENT DOCUMENTS 2633367 12/1989 France ..................... 285/354

Primary Examiner—Randolph A. Reese
Assistant Examiner—Heather Chan
Attorney, Agent, or Firm—Anthony J. Casella; Gerald E. Hespos

[57] ABSTRACT

Herein disclosed is a connector for connecting a slender pipe engageably, which connector comprises: a generally cylindrical connector body having a communication hole, a radially reduced chamber leading to the communication hole, a radially enlarged chamber stepped from and leading to the reduced chamber, a notched aperture formed in the circumferential wall of the enlarged chamber, and a retaining wall formed at the rear end of the body; a seal ring member fitted in the reduced chamber; and a retainer adapted to engage with the retaining wall and having a pawl wall made engageable with an annular bulging wall, which is formed in the vicinity of the connected end of the pipe when the pipe is inserted for connection into the connector body. The retainer has a block-shaped pawl wall formed with an engagement face at its front and a diverging face in the vicinity of the rear portion of its inner face. At least one of the back face of the pawl wall and the retaining wall has a retaining portion. The retainer has its retaining face engaged with the annular bulging wall of the inserted pipe whereas the pawl wall and the retaining wall are retained on each other by the retaining portion; when the pawl wall is fitted in the notched aperture.

6 Claims, 4 Drawing Sheets

SLENDER PIPE CONNECTING CONNECTOR

BACKGROUND OF THE INVENTION

1. Field of the Invention

The present invention relates to a slender pipe connecting connector and, more particularly, to a connector for connecting a metal pipe or resin tube having a relatively small diameter, e.g., 20 mm or less (as will be generally referred to as a "pipe"), which is to be arranged as an oil or air supply passage for a variety of machines or apparatus.

2. Description of the Prior Art

In the prior art, the connector of the above-specified type is exemplified in FIG. 17. In this connector, a retainer 22 having a pair of elastic pawl walls 23 projecting forward in a converging manner from the end of an axially center mounting hole is retained on a retaining wall 21' formed on the circumferential edge of tile rear end of a connector body 21 such that its stepped portion 24 formed of an annular wall 23' of the rear end of the retainer 22 is retained on the retaining wall 21'. In this assembled state, the pawl walls 23 are made engageable with an annular bulging wall $P_o'$ which is formed in the vicinity of the connected end portion of a pipe $P_o$ inserted.

According to this prior art, however, the retainer 22 has to have its diameter engaged by its snapping action at the pawl walls 23 to be engaged with the pipe $P_o$, so that the entire size of the product containing the connector body 21 is enlarged by the snapping function of the pawl walls 23 at the time of connecting the pipe $P_o$, to invite a difficulty in the arrangement in a narrow place. Along with the large diameter and the snapping function, the pawl walls 23 have to be elongated to weaken the binding force of the bulging wall $P_o'$ of the pipe $P_o$ and to invite the "permanent strain". This invites an axial looseness under vibrations and frequently causes a tendency to induce leakages.

If, moreover, an intense external force is applied in the extracting direction to the arranged pipe $P_o$, the pawl walls 23 are curved (or warped) externally, as indicated by phantom lines in FIG. 17, on account of the aforementioned "permanent strain". As a result, the connection grows unstable to raise a problem in the pipe connection required for the retainer 22 to have a sufficient force against an extraction.

SUMMARY OF THE INVENTION

The present invention has been conceived in view of the above-specified problems accompanying the prior art and has an object to provide a slender pipe connecting connector which is small-sized in itself so that its entirety made so compact as can be easily arranged in a narrow place, which is given a sufficient engagement with the bulging wall of the pipe and freed from the "permanent strain" to ensure a reliable connection for a long term while eliminating any leakage, which is enabled to suppress the external displacement of a retainer effectively thereby to stabilize the connection, even if an intense external force is applied in the extracting direction, by the retaining means provided between the retaining wall of the connector body and the pawl wall of the retainer, and which can suffice the connection of the pipe required to have an anti-extraction force.

In order to achieve the above-specified object, according to a major aspect of the present invention, in a connector for connecting a pipe engageably, comprising: a connector body including a connecting cylindrical wall formed at the front end of the body and defining a communication hole, an intermediate wall defining both a radially reduced chamber leading to the communication hole and a radially enlarged chamber stepped from and leading to the reduced chamber, and having a notched aperture formed in the circumferential wall of the enlarged chamber, and a retaining wall formed at the rear end of the body; a seal ring member fitted in the reduced chamber of the connector body; and a retainer adapted to engage with the retaining wall and having a pawl wall made engageable with an annular bulging wall, which is formed in the vicinity of the connected end of the pipe when the pipe is inserted for connection into the connector body, a slender pipe connecting connector, wherein the retainer is made of an elastic material and has a block-shaped pawl wall formed with an engagement face at its front and a diverging face in the vicinity of the rear portion of its inner face, and wherein at least one of the back face of the pawl wall and the retaining wall has retaining means, whereby the retainer has its retaining face engaged with the annular bulging wall of the inserted pipe whereas the pawl wall of the retainer and the retaining wall of the connector body are retained on each other by the retaining means, when the pawl wall of the retainer is fitted in the notched aperture of the connector body.

In another aspect of the present invention, the retaining means includes a projection formed to project backward from the rear end edge of the diverging face of the pawl wall of the retainer and retained on the inner circumference of the retaining wall of the connector body.

In still another aspect of the present invention, the retaining means includes: the back face of the pawl wall; and a tapering wall formed on at least one of those sides of the retainer, which face the retaining wall, and retained on the back face.

In a further aspect of the present invention, the retaining means includes: an axial projection formed to project to face the notched aperture; and the outer circumference of the pawl wall of the retainer retained on the axial projection.

In a further aspect of the present invention, the axial projection has its inner circumference held at a clearance ($\beta$) from the outer circumference of the pawl wall.

In a further aspect of the present invention, the retainer further has an arm formed at the leading end of the pawl wall and bent and sloped inward to have a converging section generally in the form of letter "L".

In a further aspect of the present invention, the edge angle ($\alpha$) of the pawl wall and the converging angle ($\theta$) of the outer circumference of the pawl wall satisfy the following relations:

$$\alpha \leq 90° - \theta.$$

According to the present invention, the retainer is formed with the block-shaped pawl wall. Thus it is possible to provide a slender pipe connecting connector which is small-sized in itself so that its entirety made so compact as can be easily arranged in a narrow place. The connector is given a sufficient engagement with the planar structure of the bulging wall of the pipe and is freed from the "permanent strain" to ensure a reliable connection for a long term while eliminating any leakage. The connector is enabled to suppress the external displacement of the retainer effectively thereby to stabilize the connection, even if an intense external force is applied in the extracting direction of the pipe, by the plane structure and the retaining means provided between the retaining wall of the connector body and the pawl wall of the retainer. Thus, the connector can suffice the connection of the pipe required to have an anti-extraction force.

Moreover, even if the pawl wall should be pushed to expand from the inside by the bulging wall in addition to the pipe extracting force, this expansion can be suppressed by the engagement between the bulging wall and the pawl wall, thus effectively preventing the pipe from coming out from the connector body.

DETAILED DESCRIPTION OF THE PREFERRED EMBODIMENTS

Figure 1:
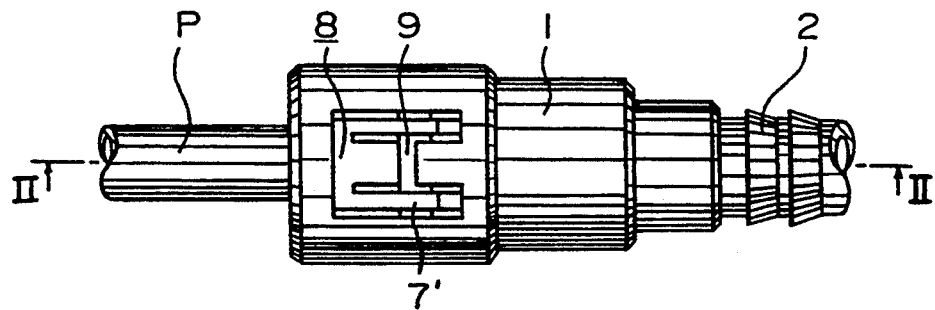
FIG. 1 is a partially cut-away top plan view showing a slender pipe connecting connector in the connecting state according to one embodiment of the present invention.
Figure 2:
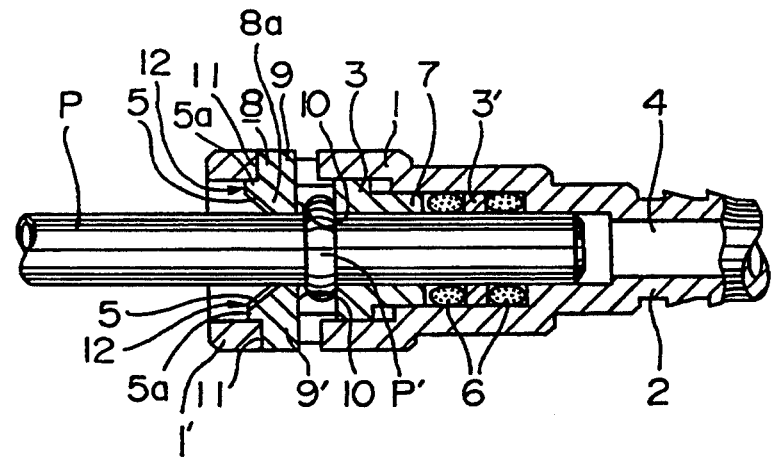
FIG. 2 is a longitudinal section taken along line II—II of FIG. 1.
Figure 3:
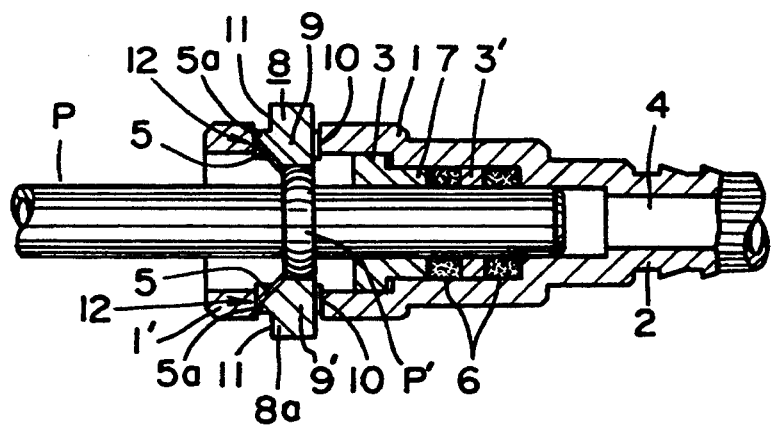
FIG. 3 is a section similar to FIG. 2 but shows the state in which the pipe is assembled.
Figure 4:
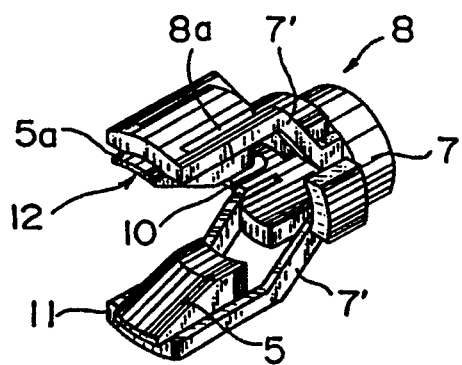
FIG. 4 is a perspective view showing a retainer of FIG. 1 itself.
Figure 5:
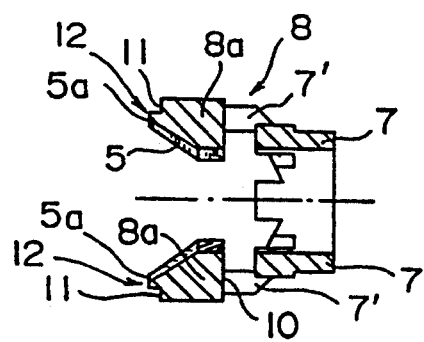
FIG. 5 is a longitudinal section taken on the center axis of FIG. 4.
Figure 6:
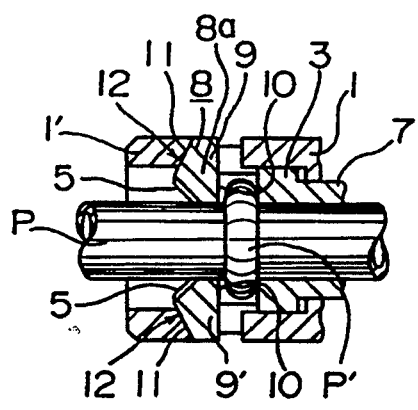
FIG. 6 is a partially cut-away section showing retaining means constituting an essential portion of another embodiment of the present invention.
Figure 7:
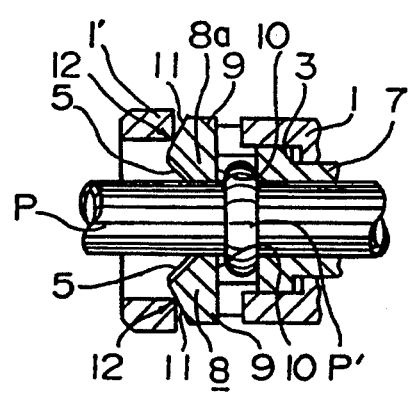
FIG. 7 is similar to FIG. 6 but shows still another embodiment.

The present invention will be described in the following in connection with the embodiments thereof with reference to FIGS. 1 to 16. Reference numeral 1 designates a connector body which is formed at its front end with a connecting cylindrical wall 2 for connecting a resin tube or rubber hose (although not shown) thereon. This cylindrical wall 2 defines a communication hole 4 therein. An intermediate wall of the connector body 1 is formed therein with a radially reduced chamber 3' leading to the communication hole 4 and a radially enlarged chamber 3 stepped from and leading to the reduced chamber 3'. The intermediate wall is further formed with notched apertures 9 and 9' which are located in the circumferential wall of the enlarged chamber 3. The connector body 1 further has a retaining wall 1' which is formed at its rear end. Moreover, a plurality of elastic seal ring members 6 of rubber or the like are fitted, if desired, in the reduced chamber 3 through a spacer.

Reference numeral 8 designates a retainer which includes a block-shaped pawl wall 8a made of an elastic material such as a resin or rubber. This pawl wall 8a is formed with a flat engagement face 10 at is front and diverging face 5 in the vicinity of the rear portion of the inner face. The pawl wall 8a is further formed with a back face 11 merging into the diverging face 5. Moreover, the retainer 8 is integrally molded of an annular wall 7, which is formed at the front in the inserting direction and made engageable with the inside of the reduced chamber for pushing the seal ring member 6, and an arm 7' which merges into the rear portion of the annular wall 7 and extending radially outward and backward. A backward projection 5a is formed to project from the back face 11 and the rear edge of the diverging face 5, to provide retaining means 12 which is made engageable with the inner circumference of the retaining wall 1'. Alternatively, the retaining means 12 is formed by a tapering wall which is located at the opposed faces of the retainer 8 and the retaining wall 1'. When the pawl wall 8a of the retainer 8 is fitted and retained in the notched apertures 9 and 9' of the connector body 1, the engagement face 10 at the front of the retainer 8 engages with the annular bulging wall P' of a pipe P inserted, so that they are retained by the retaining means 12.

Figure 8:
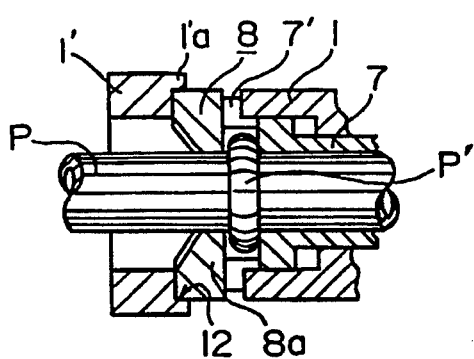
FIG. 8 is similar to FIG. 6 but shows a further embodiment.
Figure 9:
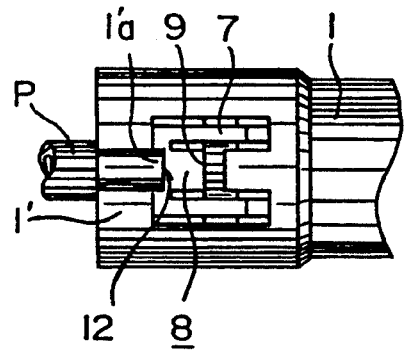
FIG. 9 is a top plan view showing the embodiment of FIG. 8.
Figure 10:
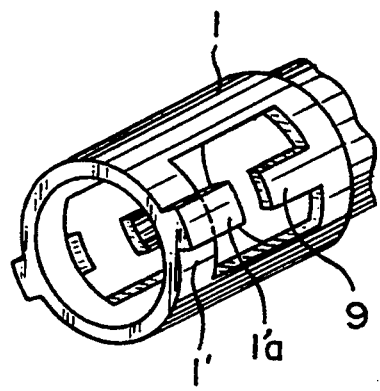
FIG. 10 is a perspective view showing a portion of a connector body used in the embodiment of FIG. 8.

Next, another embodiment of the present invention will be described with reference to FIGS. 8 to 10. The retaining wall 1' of the connector body 1 is partially projected in the axial direction toward the notched aperture 9 to form an axial projection 1'a, which is retained on the outer circumference of the pawl wall 8a of the retainer 8 to constitute the retaining member 12 thereby to prevent the retainer from being expanded.

Figure 11:
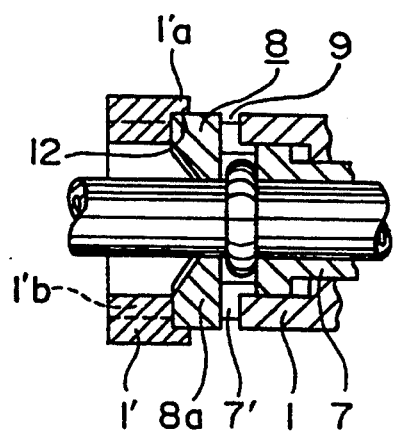
FIG. 11 is similar to FIG. 6 but shows retaining means according to a further embodiment.
Figure 12:
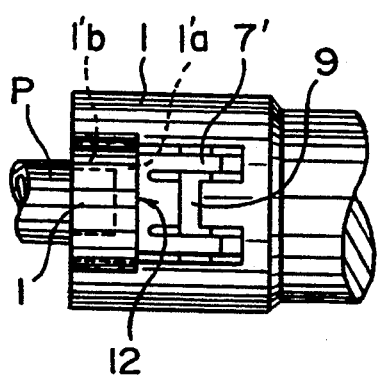
FIG. 12 is a top plan view showing the embodiment of FIG. 11.
Figure 13:
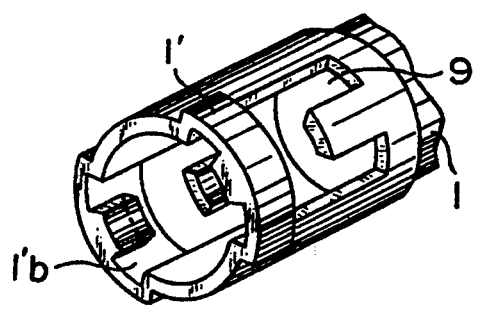
FIG. 13 is a perspective view showing a portion of a connector body used in the embodiment of FIG. 11.

Still another embodiment of the present invention is shown in FIGS. 11 to 13. In this embodiment, the retaining means 12 is exemplified by that shown in FIGS. 8 to 10, but the assembly of the retainer 8 is simplified by forming an axial groove 1'b in the inner circumference of the retaining wall 1' while preventing the outer circumference of the arm 7' from abutting against the inner circumference of the retaining wall 1'.

Figure 14:
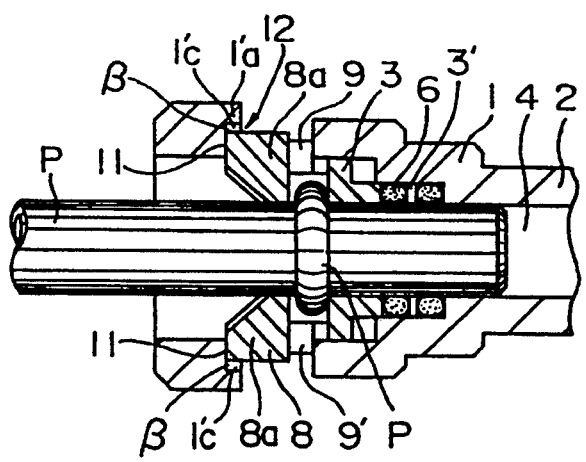
FIG. 14 is similar to FIG. 2 but shows another embodiment of FIG. 13.
Figure 15:
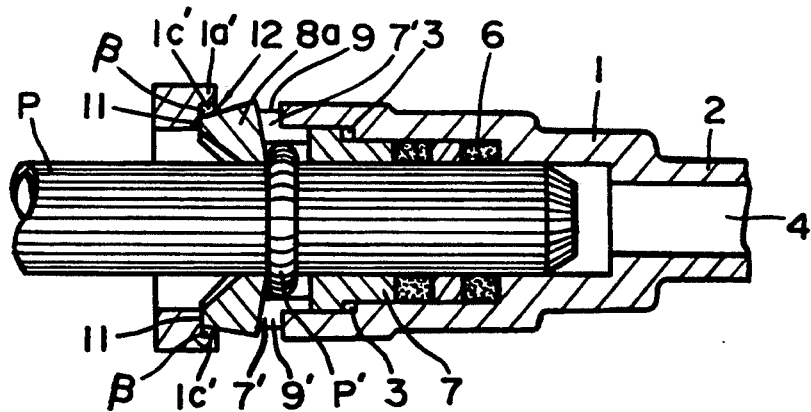
FIG. 15 is similar to FIG. 2 but shows a further embodiment.
Figure 16:
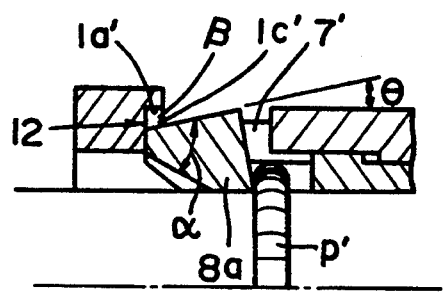
FIG. 16 is a partially enlarged section of FIG. 15.
Figure 17:
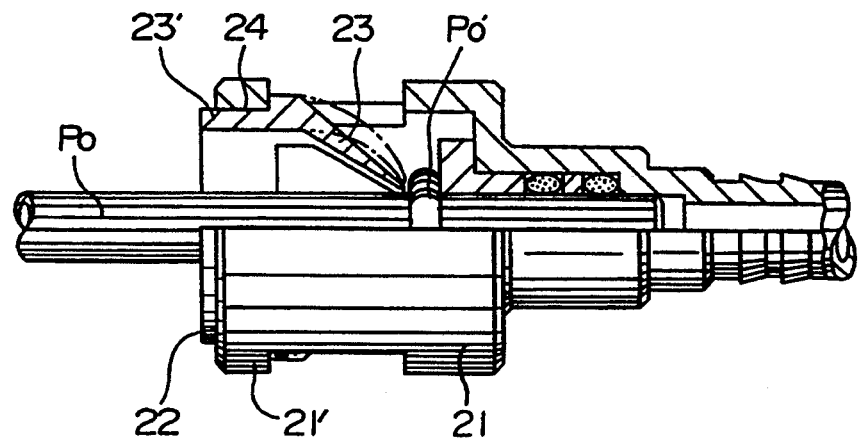
FIG. 17 is a longitudinal section showing the example of the prior art.

FIGS. 14 to 16 show a modification of the embodiment shown in FIGS. 11 to 13. In this modification, the pawl wall 8a is fitted in engagement with the aforementioned notched apertures 9 and 9', and a clearance $\beta$ is held between the pawl wall 8a and the inner circumference 1'c of the projection 1'a. With the pipe P being connected, the annular bulging wall P' in the vicinity of the connected portion is clamped by the pawl wall 8a.

If the aforementioned arm 7' is bent and sloped inward to have a converging section generally in the form of letter "L", as shown in FIG. 15, the retention with the projection 1'a is further ensured to improve the prevention of the looseness of the pipe P. At this time, it is the most preferable for the looseness prevention that tile edge angle $\alpha$ of the pawl wall 8a be equal to or less than 90° and should preferably satisfy the following relations with the converging angle $\theta$ of the outer circumference of the pawl wall 8a:

$$\alpha \leq 90° - \theta.$$

As has been described hereinbefore, the slender pipe connecting connector according to the present invention is characterized by: the block-shaped pawl wall 8a formed in the retainer 8 having the aforementioned retaining means 12; and the engagement of the flat engagement face 10 at the front face of the pawl wall 8a, when retained in the notched apertures 9 and 9', with the bulging wall p' of the pipe P. Thus, it is possible to provide a remarkably useful slender pipe connecting connector which is small-sized in accordance with the size reduction of the retainer 8 itself so that its entirety made so compact as can be easily arranged in a narrow place. The connector is given a sufficient engagement with the planar structure of the bulging wall P' of the pipe P and is freed from the "permanent strain" at the engagement face 10 to ensure a reliable connection for a long term while eliminating any leakage. The connector is enabled to suppress the external displacement of the retainer effectively thereby to stabilize the connection, even if an intense external force is applied in the extracting direction of the pipe P, by the planar structure and the retaining means 12 provided between the retaining wall of the connector body and the pawl wall of the retainer. Thus, the connector can suffice the connection of the pipe required to have an anti-extraction force.

What is claimed is:

1. A connector for a pipe having a front end and a bulging wall spaced from the front end, the bulging wall having a front side facing the front end of the pipe and an opposed rear side, said connector comprising:

a connector body having opposed front and rear ends, a connecting wall extending rearwardly from the front end of the connector body and defining a communication hole extending therethrough, an intermediate wall extending rearwardly from the connecting wall and defining a radially reduced chamber extending rearwardly from the communication hole and a radially enlarged chamber extending rearwardly from the radially reduced chamber, the intermediate wall including a plurality of notched apertures extending outwardly from the radially enlarged chamber, and a retaining wall extending from the intermediate wall to the rear end of the connector body, the retaining wall having an inner circumferential surface and a forwardly facing retaining surface adjacent the notched apertures;

a seal ring member disposed in the radially reduced chamber for sealing engagement with the pipe; and a retainer having opposed front and rear ends, the front end of the retainer defining an annular wall disposed adjacent the seal ring member and dimensioned to engage portions of the pipe forward of the bulging wall, a plurality of resiliently deflectable arms projecting rearwardly from said annular wall, block-shaped pawl walls on portions of the respective arms remote from said annular wall, said pawl walls being dimensioned for deflection into the respective notched apertures, each said pawl wall including a front engagement face for engaging the rear side of said bulging wall, each said pawl wall further including an outer circumferential surface having a notch at the rear end of the retainer, said notch including a rearwardly facing surface engaging the forwardly facing retaining surface of the retaining wall of the connector body at one said notched aperture and having an outwardly facing surface engaging the inner circumferential surface of the retaining wall of the connector body for preventing radially outward deflection of said pawl walls and said arms after insertion of said pipe into said connector.

2. A connector for a pipe having a front end and a bulging wall spaced from the front end, the bulging wall having a front side facing the front end of the pipe and an opposed rear side, said connector comprising:

a connector body having front and rear ends, a connecting wall extending rearwardly from the front end of the connector body and defining a communication hole extending therethrough, an intermediate wall extending rearwardly from the connecting wall and defining a radially reduced chamber extending rearwardly from the communication hole and a radially enlarged chamber extending rearwardly from the radially reduced chamber, the intermediate wall including a plurality of notched apertures extending outwardly from the radially enlarged chamber, and a retaining wall extending from the intermediate wall to the rear end of the connector body, the retaining wall having forwardly facing retaining surfaces adjacent the notched apertures, and projections extending forwardly from radially outer portions of said retaining wall and into the respective notched apertures;

a seal ring member disposed in the radially reduced chamber for sealing engagement with the pipe; and a retainer having opposed front and rear ends, the front end of the retainer defining an annular wall disposed adjacent the seal ring member and dimensioned to engage portions of the pipe forward of the bulging wall, a plurality of resiliently deflectable arms projecting rearwardly from said annular wall, block-shaped pawl walls on portions of the respective arms remote from said annular wall and dimensioned for deflection into the respective notched apertures, each said pawl wall including: a front engagement face for engaging the rear side of said bulging wall; a back face engaging the forwardly facing retaining surface of the retaining wall; and an outer circumferential face in opposed relationship to one said projection of the retaining wall, such that said projections prevent radially outward deflection of the pawl walls after connection of said pipe into said connector.

3. A connector according to claim 2, wherein each said projection has an inner circumferential surface held at a clearance ($\beta$) from the outer circumferential surface of the respective pawl wall.

4. A connector according to claim 3, wherein radially inner portions of each said pawl wall adjacent the respective back face thereof define a diverging wall which diverges outwardly to the rear end of the retainer for generating outward deflection of the pawl walls during insertion of the pipe into the connector, and wherein the outer circumferential surface of each said pawl wall defines a converging wall which is angled inwardly and rearwardly to define an edge angle ($\alpha$) between the diverging and converging walls of each said pawl wall the converging wall defining an angle ($\Theta$) relative to the longitudinal axis of the connector to satisfy the following relations:

$$\alpha \leq 90° - \Theta.$$

5. A connector for a pipe having a front end and a bulging wall spaced from the front end, the bulging wall having a front side facing the front end of the pipe and an opposed rear side, said connector comprising:

a connector body having opposed front and rear ends, a connecting wall extending rearwardly from the front end of the connector body and defining a communication hole extending therethrough, an intermediate wall extending rearwardly from the connecting wall and defining a radially reduced chamber extending rearwardly from the communication hole and a radially enlarged chamber extending rearwardly from the radially reduced chamber, the intermediate wall including a plurality of notched apertures extending outwardly from the radially enlarged chamber, and a retaining wall extending from the intermediate wall to the rear end of the connector body, the retaining wall having a forwardly facing retaining surface adjacent the notched apertures;

a seal ring member disposed in the radially reduced chamber for sealing engagement with the pipe; and a retainer having opposed front and rear ends, the front end of the retainer defining an annular wall disposed adjacent the seal ring member and dimensioned to engage portions of the pipe forward of the bulging wall, a plurality of resiliently deflectable arms projecting rearwardly from said annular wall, block-shaped pawl walls on portions of the respective arms remote from said annular wall, said pawl walls being dimensioned for deflection into the respective notched apertures, each said pawl wall including a front engagement face for engaging the rear side of said bulging wall, each said pawl wall further including a back face angled outwardly and forwardly for engagement inwardly and forwardly of the retaining surface of the retaining wall of the connector body, such that the retaining wall of the connector body prevents radially outward deflection of said pawl walls and said arms after connection of said pipe to said connector.

6. A connector as in claim 5, wherein the forwardly facing retaining surfaces of said annular retaining wall on said connector are angularly aligned for substantial face-to-face engagement with the angled back face of each said pawl wall.

* * * * *